United States Patent

Galas et al.

[11] Patent Number: 5,895,194
[45] Date of Patent: Apr. 20, 1999

[54] METHOD AND APPARATUS FOR LOADING BULK CONTAINERS SUCH AS RAILROAD CARS, WITH BULK MATERIAL

[75] Inventors: Bogdan A. Galas, Randburg; Clifford John Watkiss, Chartwell, both of South Africa; Horst Minor, Neukirchen-Vluyn, Germany

[73] Assignee: Krupp Fördertechnik GmbH, Essen, Germany

[21] Appl. No.: 08/792,839

[22] Filed: Jan. 30, 1997

[30] Foreign Application Priority Data

Jan. 31, 1996 [DE] Germany .................. 196 03 498

[51] Int. Cl.⁶ ................................ B65G 67/22
[52] U.S. Cl. .................. 414/329; 414/397; 414/808; 414/809
[58] Field of Search .................. 414/216, 288, 414/328, 329, 389, 397, 414, 808, 809; 193/2 C; 198/532, 534; 222/526, 537, 544, 547, 564

[56] References Cited

U.S. PATENT DOCUMENTS

| | | |
|---|---|---|
| 2,699,248 | 1/1955 | Shabaker ................. 198/532 |
| 3,707,222 | 12/1972 | Hartley ................... 198/534 |
| 3,797,682 | 3/1974 | De Beer ................. 414/389 X |
| 4,065,005 | 12/1977 | Mahle et al. ............. 414/397 |
| 4,136,804 | 1/1979 | Kinzler et al. ........... 222/547 |
| 4,284,380 | 8/1981 | Brumbaugh, Jr. et al. ... 414/329 X |
| 4,372,730 | 2/1983 | Ladt ..................... 414/809 |

FOREIGN PATENT DOCUMENTS

| | | | |
|---|---|---|---|
| 562914 | 6/1960 | Belgium ................. 414/328 |
| 914447 | 3/1982 | Russian Federation ..... 414/329 |
| 1204530 | 1/1986 | Russian Federation ..... 414/329 |
| 1291517 | 2/1987 | Russian Federation ..... 414/329 |
| 1312037 | 5/1987 | Russian Federation ..... 414/329 |
| 1664685 | 7/1991 | Russian Federation ..... 414/328 |
| 1703592 | 1/1992 | Russian Federation ..... 414/328 |

*Primary Examiner*—James W. Keenan
*Attorney, Agent, or Firm*—Venable; Gabor J. Kelemen; Catherine M. Voorhees

[57] ABSTRACT

A method and apparatus for loading a traveling bulk container with bulk material. The bulk container is moved in a traveling direction underneath a loading chute. A bulk material stream is put into motion while the bulk container is being moved in the traveling direction underneath the loading chute. The bulk container is loaded with bulk material in the bulk material stream while the bulk container is moving along in the traveling direction underneath the loading chute, and is further substantially completely loaded in a front region thereof close to a front edge thereof with the bulk material. The bulk material stream is constricted at a front side thereof when the bulk material stream is put into motion thereby forming a constriction in the bulk material stream. The constriction in the bulk material stream is opened so as to follow a movement of the bulk container until the bulk material stream flows into the bulk container without the constriction.

15 Claims, 4 Drawing Sheets

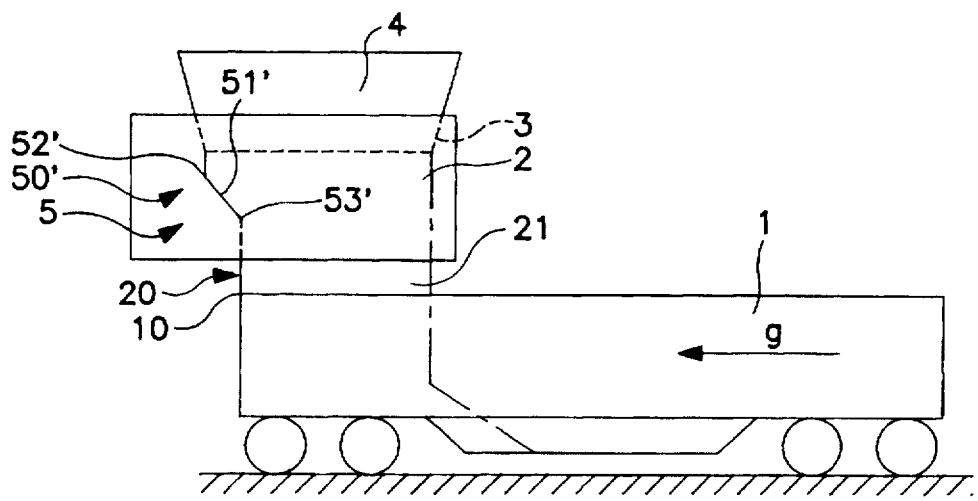
FIG. IA
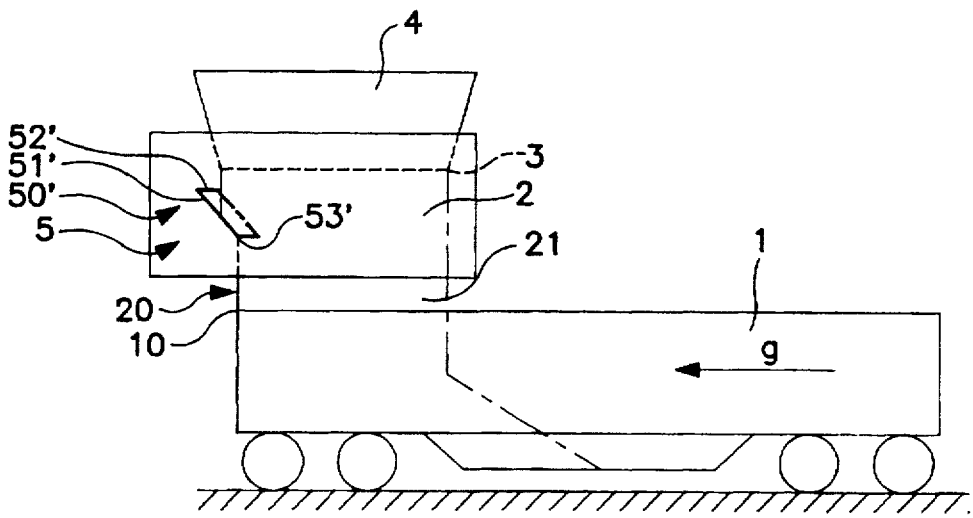
FIG. IB
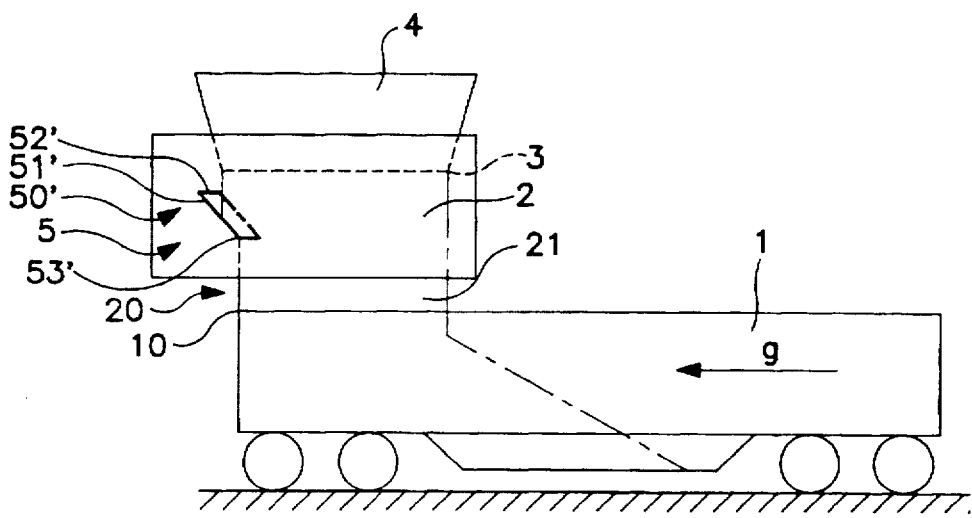
FIG. IC

1

METHOD AND APPARATUS FOR LOADING BULK CONTAINERS SUCH AS RAILROAD CARS, WITH BULK MATERIAL

FIELD OF THE INVENTION

The invention relates to a method and an apparatus for loading bulk containers, such as railroad cars, with bulk material. For this process, a bulk container that is to be loaded is loaded while it is moving along in the direction of travel underneath the loading chute after a bulk material conveying stream has been put into motion, such as the opening of a bulk material hopper.

BACKGROUND OF THE INVENTION

For braking or accelerating the bulk containers, large forces are needed, particularly when railroad cars to be loaded are combined in a train, so that, as a rule, railroad cars are loaded while they are moving. During the loading of moving railroad cars it is difficult, however, to also completely fill their front regions as seen in the direction of travel, especially close to the front edge of railroad car. The reason for the above is that, on the one hand, at the beginning of the loading process, the bulk material stream only builds up to its full force with a certain delay and, on the other hand, the loading process can be started only when the railroad car, especially the front edge of the railroad car, is in a position in which the bulk material stream flows entirely into the railroad car. Once the bulk material stream has developed its full force, the front edge of the railroad car has already moved forward further so that a complete filling of this region is not possible.

To counter this problem, GB-A-2 283 226 proposes a loading apparatus having a loading chute which is disposed under a bulk hopper and which can be moved parallel to the railroad car to be loaded and which comprises an intermediate bin. At the beginning of the loading process, the front region of the developing bulk material stream as seen in the direction of travel is first guided into the intermediate bin, whereas the rear region of the bulk material stream as seen in the direction of travel flows directly into the railroad car. The loading chute follows the movement of the railroad car to be loaded on a partial section such that the railroad car is also being filled in its front region, with the intermediate bin also being discharged into the railroad car because of the movement of the loading chute. During this process, the bulk material from the intermediate bin is guided into the railroad car via the front region of the movable chute as seen in the direction of travel of the railroad car so that this material preferably serves to fill the front region of the railroad car. Before loading the next railroad car, the loading chute must be moved back into its initial position.

SUMMARY OF THE INVENTION

It is the object of the present invention to entirely eliminate, if possible, the reversible tracking of the loading chute for a loading method or apparatus of the generic type, which tracking can only be accomplished with a relatively large structural complexity and which is therefore relatively cost-intensive, and to allow a complete and fast loading of the railroad car at the same time.

As a solution, according to the invention, a method is provided for loading a traveling bulk container with bulk material which comprises the steps of moving the bulk container in a traveling direction underneath a loading chute; putting into motion a bulk material stream while the bulk container is being moved in the traveling direction underneath the loading chute; loading the bulk container with bulk material in the bulk material stream while the bulk container is moving along in the traveling direction underneath the loading chute; substantially completely loading the bulk container in a front region thereof close to a front edge thereof; constricting the bulk material stream at a front side thereof when the bulk material stream is put into motion thereby forming a constriction in the bulk material stream; and opening the constriction in the bulk material stream so as to follow a movement of the bulk container until the bulk material stream flows into the bulk container without the constriction. Additionally, the invention provides an apparatus for loading a traveling bulk container which comprises: a bulk material hopper containing bulk material therein; a loading chute disposed adjacent the hopper for conveying the bulk material in a bulk material stream from the hopper to the bulk container when the bulk container is moving underneath the loading chute in a traveling direction; and means for substantially completely loading the bulk container in a front region thereof close to a front edge thereof, the means for substantially completely loading comprising means for variably constricting the bulk material stream being conveyed by the loading chute into the bulk container at a front side of the bulk material stream. In a method according to the invention, the bulk material stream is constricted at its front side, particularly at the beginning of the loading process, and this constriction of the bulk material stream is opened so as to be following the movement of the bulk container until the bulk material stream freely flows into the bulk container. In an apparatus according to the invention, the known prior art apparatus for the largely complete loading of the bulk container comprises means in its front region as seen in the direction of travel for the variable constriction of the bulk material stream on the front side of the bulk material stream as seen in the direction of movement of the bulk container.

The constricting means may be a movable guide arrangement such as, e. g., a movable baffle plate. Thus, a movement of the entire loading chute is eliminated. Furthermore, the constriction of the bulk material stream has the effect that, at the beginning of the loading process, the bulk material stream, which initially is not yet flowing with its full force, is concentrated on the front region of the moving bulk container while the bulk container with its front loading edge has not yet reached the front edge of the unconstricted bulk material stream.

Thus, it is even possible to load the bulk containers to be loaded at higher speeds and to accelerate the loading process in this manner. In the loading methods or loading apparatuses disclosed in the prior art, the speed of the railroad car had to be selected to be so low that the bulk material stream, which is not yet fully formed at the beginning of the loading process, could completely fill the front region of the railroad car, with additionally a partial stream of this developing bulk material stream even being diverted into an intermediate bin; the present method according to the invention and the present apparatus according to the invention, however, first guide the bulk material stream in a targeted manner at the beginning of the loading process into the front region of the bulk container to be loaded so that the front region of the bulk container is filled relatively quickly and on a preferred basis and—for this reason—the bulk container can be moved faster.

It is understood that a bulk container to be loaded according to the invention does not have to be moving or be moving uniformly during the entire loading process. It is equally understood that the methods and apparatuses according to the invention are not limited to using bulk material hoppers but that all other options (methods and apparatuses) where bulk containers are loaded from on top with a bulk material stream, e. g., via conveyor belts or conveyor pipes can also be used. The invention is likewise not limited to the loading of bulk containers that are combined in a train, but it can be used—in principle—for all loading processes of traveling bulk containers, e. g., for trucks, ships or the like.

Furthermore, the present invention is not limited to the presence of a loading chute in the narrower sense, rather the term loading chute encompasses all arrangements which serve the guidance of the flowing bulk material stream during its transition from the bulk material feeder element to the bulk container. It is understood, in particular, that the constricting means may also be a component of the loading chute and that it is possible to move specific assemblies of the loading chute by way of the constricting means without having to dispense with the advantages of the construction of the bulk material stream according to the invention.

As a rule, it is advantageous to provide the constricting means separately from the gate of a bulk material hopper so that the bulk material stream can build up in a manner that is as unhindered as possible. But it is also conceivable to carry out the method according to the invention by means of asymmetrical opening of a hopper gate.

The constriction according to the invention can already be accomplished for the subsequent loading process just before the end of the respective loading process. Thus, the bulk material stream is concentrated on the end region of the bulk container.

The above-mentioned method steps and components as well as those that are described with respect to the various embodiments and that are to be used in accordance with the invention, are not subject to any particular exceptional conditions with respect to their method requirements, their size, shaping, material selection and technical design so that the selection criteria known in the respective application can be applied without limitation.

BRIEF DESCRIPTION OF THE DRAWINGS

Further details, features and advantages of the subject matter of the invention ensue from the following description of the associated drawings which illustrate preferred embodiments of the invention by way of example. In the drawings:

FIG. 1A shows a first embodiment of a loading apparatus according to the invention in a schematic side elevational view at the beginning of the loading process;

FIG. 1B is a view similar to FIG. 1A showing the embodiment of FIG. 1A in a working position shortly after loading begins;

FIG. 1C is a view similar to FIGS. 1A and 1B showing the embodiment of FIGS. 1A and 1B in a working position after the full release of the bulk material stream;

DETAILED DESCRIPTION OF THE INVENTION

Figure 2A:
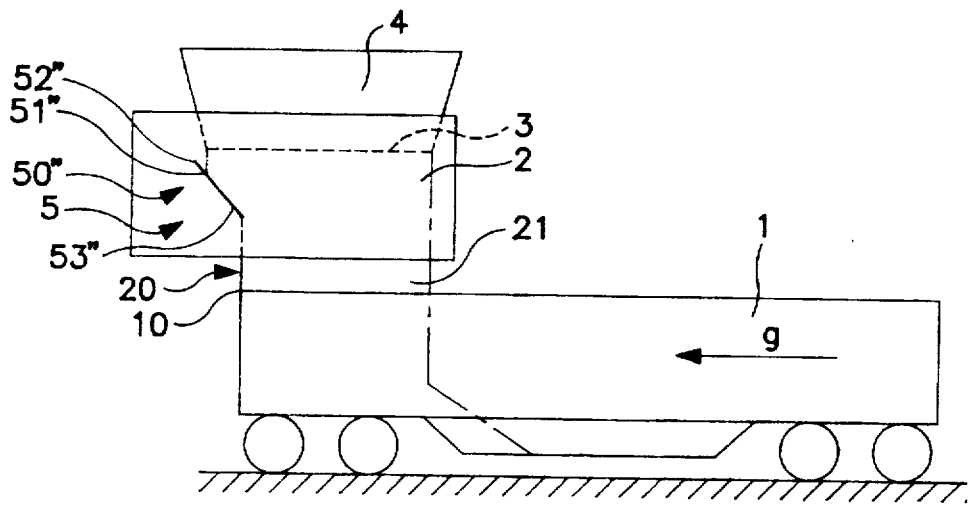
FIGS. 2A to 2C are views similar to FIGS. 1A, 1B and 1C, respectively, showing a second embodiment of a loading apparatus according to the invention.
Figure 2B:
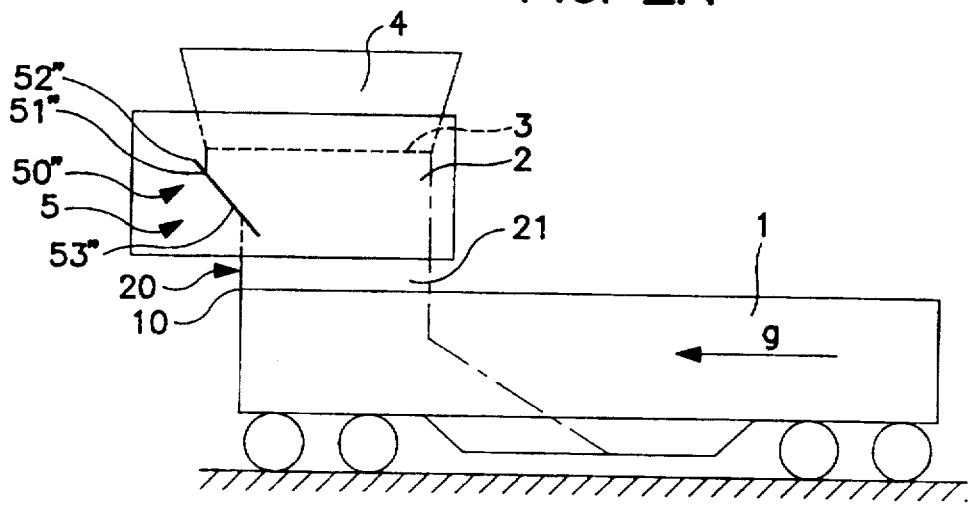
Figure 2C:
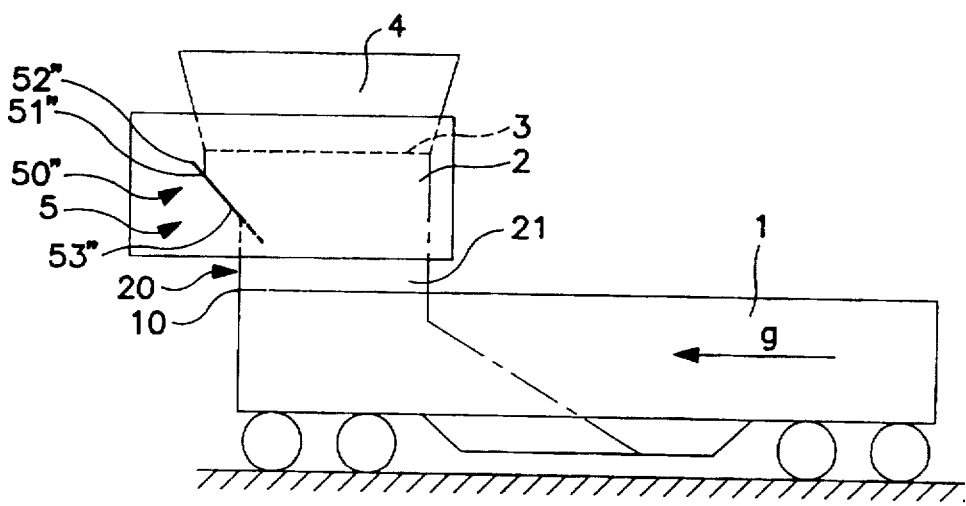
Figure 3A:
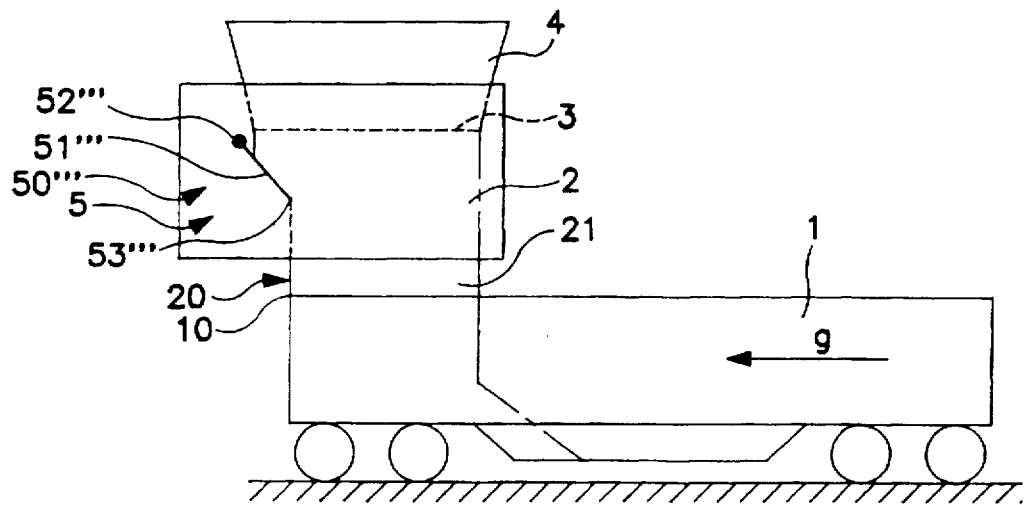
FIGS. 3A to 3C are views similar to FIGS. 1A, 1B and 1C, respectively, showing a third embodiment of a loading apparatus according to the invention.
Figure 3B:
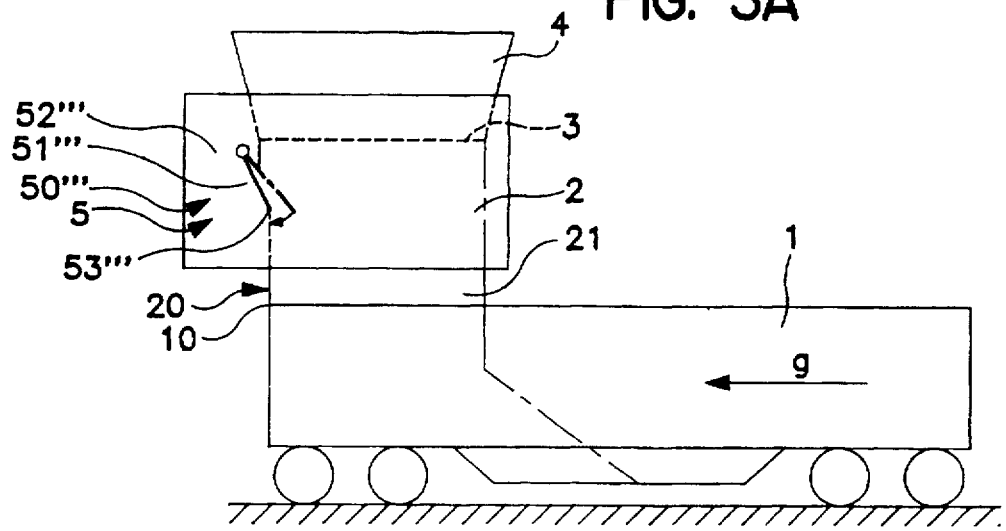
Figure 3C:
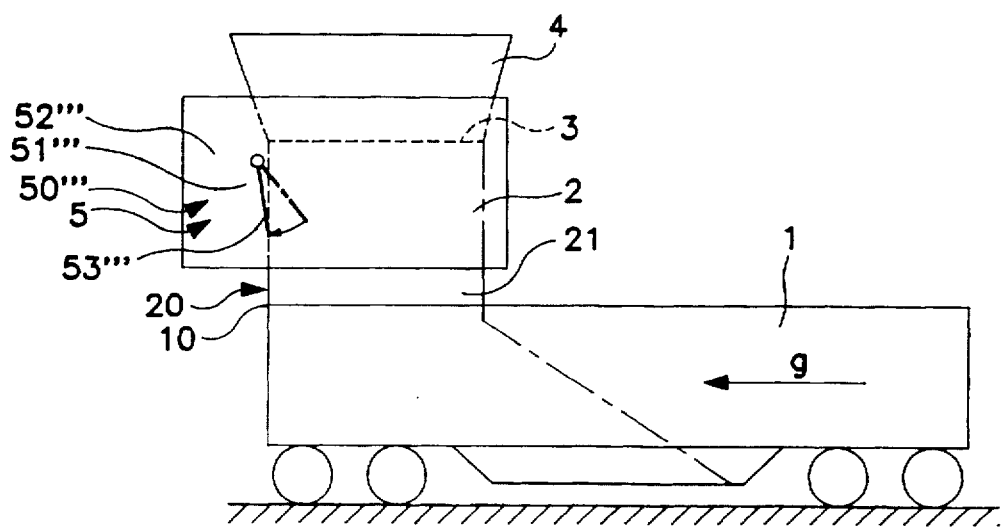

For the embodiments shown in the figures, a railroad car 1 is loaded with bulk material 2 from a bulk material hopper 4 via a loading chute 3. The railroad car is moved in a direction of movement or travel 9 into a position underneath the loading apparatus comprising the loading chute 3 and the bulk material hopper 4. Because of its direction of movement 9, one of the edges of the railroad car 1 is defined as front edge 10 of the railroad car.

At the appropriate time, the railroad car 1 is loaded by way of a bulk material stream 21 (illustrated with a dash-dot line)—as will be explained below. This bulk material stream 21 has a side 20 which is forwardly disposed in the direction of travel, or front side 20, and which results from the direction of movement 9 of the railroad car 1. At front side 20 of the developing bulk material stream 21, constricting means 5 are provided which constrict the bulk material stream 21 at its front side 20 in a manner explained further below, and which can release the entire bulk material stream. It is understood that—in principle—similar constricting means can also be provided on the other side of the bulk material stream, e. g., if the railroad car is intended to be loaded when the direction of movement is opposite.

In the first embodiment shown in FIGS. 1A to 1C, the constricting means 5 comprise a movable guide arrangement 50' having a baffle plate 51' sloped downward counter to the direction of movement 9 and a positioning arrangement, not shown. The positioning arrangement is configured such that it can move the baffle plate 51' approximately parallel to the direction of movement 9 of the railroad car 1 out of the bulk material stream 21 or into the bulk material stream. The baffle plate 51' comprises an outside edge 52' arranged outside of the bulk material stream and a leading edge 53'.

At the beginning of the loading process (see FIG. 1A), the baffle plate 51' is positioned such that the leading edge 53' is substantially disposed above the front edge of the railroad car and the bulk material stream 21 is constricted, that is, tapered in its cross section at its front side 20 with respect to the front region of the railroad car. The front region of the railroad car is defined, inter alia, by the speed of the railroad car 1, the flow speed of the bulk material 2 and the bulk material cones formed by the bulk material 2, and is the region in which—without additional measures—perfect, in particular, complete loading would not be possible.

At the beginning of the loading process, the forming bulk material stream 21 is constricted to this front region, in particular, close to the front edge 10 of the railroad car. Following the movement of the railroad car 1, the baffle plate 51' is shifted parallel to the direction of movement 9 of the railroad car 1 so that the leading edge 53' is substantially disposed above the front edge 10 of the railroad car. It is understood that, depending on the requirements, the baffle plate 51' or the constricting means 5 can be moved so as to lag behind or run ahead of the railroad car 1 to constrict the bulk material stream 21 in the manner proposed by the invention and allow a largely complete loading of the railroad car.

The baffle plate 51' releases the bulk material stream 21 completely (that is, without tapering the same) at a specific point in time or in a specific position of the railroad car 1 (see FIG. 1C) and the filling of the railroad car 1 continues in the conventional manner.

Compared to the first embodiment, the apparatuses corresponding to the second and third embodiment are provided with slightly modified movable guide arrangements 50" and 50'".

The movable guide arrangement 50" of the second embodiment comprises a baffle plate 51" which substantially can be shifted in its own plane to an inclined upward and inclined downward position. Since the baffle plate 51", like the baffle plate 51' of the first embodiment, is sloped with respect to the vertical, a shifting of the baffle plate in the baffle plate plane has the effect that the baffle plate 51" can be moved into or out of the bulk material stream 21 with relatively small force expenditure.

Figure 4:
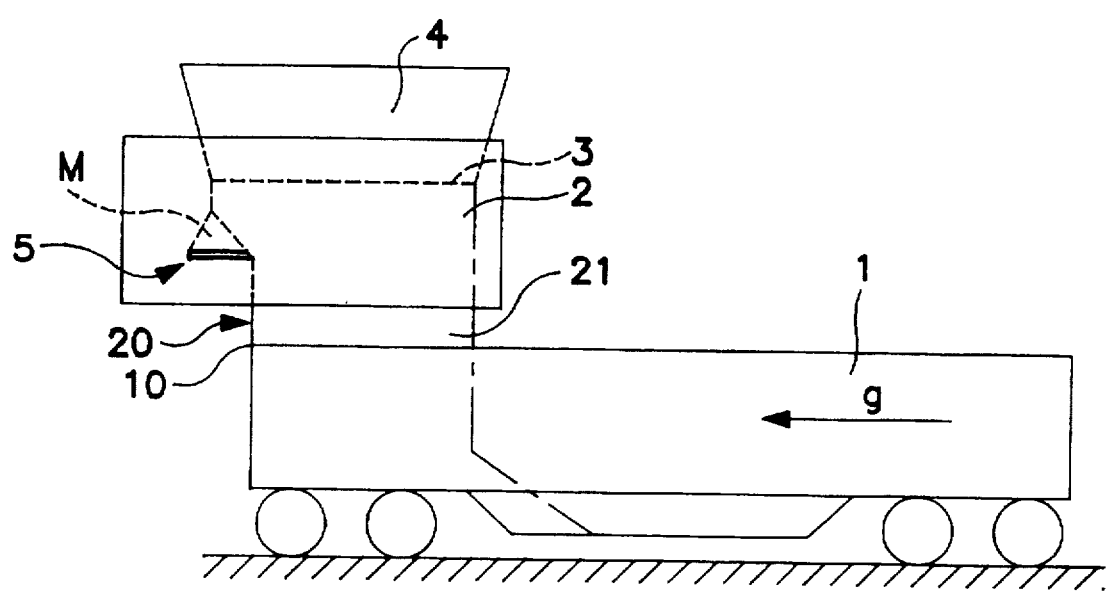
FIG. 4 is a view similar to FIGS. 1A, 2A and 3A, showing a fourth embodiment of a loading apparatus according to the invention.

In a modification of this second embodiment, as shown in FIG. 4 the baffle plate can be oriented approximately horizontally. The mode of operation is the following: when the front edge 10 of the railroad car is at the level of the leading edge, the hopper gate can be opened. A small portion of the outflowing bulk material 2 builds up on the baffle plate until it has formed a material mound M there which is a function of the angle of repose, with the slope of the material mound as bulk material guide surface having the same function as an angularly inclined baffle plate. The horizontally arranged baffle plate is moved backward, e. g., at the speed of the railroad car, so as to open up the entire aperture of the loading chute 3. During this process, the material disposed on the baffle plate can be stripped, if desired, and it falls into the railroad car 1 together with the subsequent bulk material. To simplify the baffle plate control, the baffle plate can be pulled back independently of the speed of the railroad car as soon as the entire chute aperture is disposed above the railroad car 1. In this case, the horizontally arranged baffle plate is operated hydraulically and guided outside of as well as inside of the loading chute 3. In this modification, the constriction according to the invention is thus accomplished by the surface of the bulk material cone on the baffle plate, which surface forms with a downward slope extending counter to the direction of movement 9 of the railroad car 1.

The baffle plate 51'" of the third embodiment is seated so as to be pivotable around its edge 52'" disposed outside of the bulk material stream 21 so that the leading edge 53'" is guided into the bulk material stream 21 and can be pivoted out of the bulk material stream through the rotation of the baffle plate 51'" around an axis extending through the edge 52'".

With the second and third embodiment, the loading process is similar to the one described for the first embodiment in that, at the beginning of the loading process, the leading edge 52' or 53'" is positioned such that the baffle plate 51" or 51'" constricts the bulk material stream 21 at its front side 20 in the manner according to the invention and, during the further loading of the railroad car 1 or with its progressing movement, the constricting means 5 release the bulk material stream 21 through corresponding movement of the baffle plate 51" or 51'" and its leading edge 53" or 53'".

It is understood that the angles of incidence of the baffle plates 51', 51" and 51'" can be adapted to the requirements of each case.

We claim:

1. A method for loading a traveling bulk container with bulk material, said traveling bulk container having a front wall, a rear wall and two side walls, the method comprising the steps of:

moving the bulk container in a traveling direction underneath a loading chute;

putting into motion a bulk material stream while the bulk container is being moved in the traveling direction underneath the loading chute;

loading the bulk container with bulk material in the bulk material stream while the bulk container is moving along in the traveling direction underneath the loading chute, the step of loading including the step of substantially completely loading the bulk container in a front region thereof close to the front wall thereof;

constricting the bulk material stream at a front side thereof when the bulk material stream is put into motion thereby forming a constriction in the bulk material stream; and opening the constriction in the bulk material stream so as to follow a movement of the bulk container until the bulk material stream flows into the bulk container without the constriction.

2. The method according to claim 1, further comprising the steps of:

providing a means for variably constricting the bulk material stream; and moving the means for variably constricting, prior to the step of putting into motion, into a constricting position in which the means for variably constricting is adapted to constrict the bulk material stream.

3. The method according to claim 1, further comprising the step of providing a means for variably constricting the bulk material stream including a baffle plate selectively movable into and out of the bulk material stream, wherein the step of opening the constriction comprises the step of moving the baffle plate out of the bulk material stream.

4. The method according to claim 3, wherein the baffle plate is approximately horizontal, the method further comprising the steps of:

moving the baffle plate, prior to the step of putting into motion, into a constricting position in which the baffle plate is adapted to constrict the bulk material stream;

building a mound of the bulk material on the baffle plate; and delivering the bulk material stream onto the mound such that a slope of the mound guides the bulk material stream into the bulk container.

5. The method according to claim 1, further comprising the steps of:

providing a means for variably constricting the bulk material stream including a baffle plate selectively movable into and out of the bulk material stream; and moving the baffle plate, prior to the step of putting into motion, into a constricting position in which the baffle plate is adapted to constrict the bulk material stream.

6. The method according to claim 1, wherein the step of putting into motion includes the step of opening a bulk material hopper.

7. An apparatus for loading a traveling bulk container having a front wall, a rear wall and side walls, said apparatus comprising:

a bulk material hopper containing bulk material therein;

a loading chute disposed adjacent the hopper for conveying the bulk material in a bulk material stream from the hopper to the bulk container when the bulk container is underneath the loading chute and is moving in a traveling direction; and means for substantially completely loading the bulk container in a front region thereof close to the front wall thereof with the bulk material, the means for substantially completely loading comprising means for variably constricting the bulk material stream being conveyed by the loading chute into the bulk container at a front side of the bulk material stream, and wherein gradually opening the means for variably constricting so as to follow the movement of the bulk container allows the bulk material stream to flow into the bulk container without any constriction.

8. The apparatus according to claim 7, wherein the means for variably constricting includes a movable guide arrangement disposed for acting on the front side of the bulk material stream.

9. The apparatus according to claim 8, wherein the movable guide arrangement is disposed above an upper edge of the bulk container.

10. An apparatus according to claim 8, wherein the movable guide arrangement includes:

a baffle plate having:
   an outside edge adapted to be disposed outside of the bulk material stream; and
   a leading edge; and a means for moving the baffle plate into at least two positions including:
   a constricting position in which the leading edge and a portion of the baffle plate adjacent the leading edge and oriented toward the outside edge are adapted to constrict the bulk material stream; and
   a release position in which the bulk material stream flows freely into the bulk container.

11. The apparatus according to claim 10, wherein the baffle plate is sloped downward counter to the traveling direction.

12. The apparatus according to claim 11, wherein the means for moving the baffle plate is configured to move the baffle plate approximately parallel to the traveling direction of the bulk container for arriving at the at least two positions.

13. The apparatus according to claim 11, wherein the means for moving the baffle plate is configured to move the baffle plate substantially in a plane of the baffle plate for arriving at the at least two positions.

14. The apparatus according to claim 11, wherein:
   the baffle plate is pivotable about its outside edge; and
   the means for moving the baffle plate is configured to pivot the baffle plate about its outside edge for arriving at the at least two positions.

15. The apparatus according to claim 10, wherein the baffle plate is approximately horizontal.

* * * * *